United States Patent
Skalecki et al.

(10) Patent No.: US 11,356,356 B2
(45) Date of Patent: Jun. 7, 2022

(54) PERMITTED NETWORK RISKS IN DIVERSE ROUTE DETERMINATIONS

(71) Applicant: Ciena Corporation, Hanover, MD (US)

(72) Inventors: Darek Skalecki, Ottawa (CA); Gerald Smallegange, Stittsville (CA); Amal Karboubi, Oshawa (CA)

(73) Assignee: Ciena Corporation, Hanover, MD (US)

( * ) Notice: Subject to any disclaimer, the term of this patent is extended or adjusted under 35 U.S.C. 154(b) by 43 days.

(21) Appl. No.: 16/660,134

(22) Filed: Oct. 22, 2019

(65) Prior Publication Data

US 2021/0119903 A1    Apr. 22, 2021

(51) Int. Cl.

| | |
|---|---|
| *H04L 12/735* | (2013.01) |
| *H04L 12/707* | (2013.01) |
| *H04L 12/723* | (2013.01) |
| *H04L 45/128* | (2022.01) |
| *H04L 45/00* | (2022.01) |
| *H04L 45/50* | (2022.01) |

(52) U.S. Cl.
CPC ............ *H04L 45/128* (2013.01); *H04L 45/22* (2013.01); *H04L 45/50* (2013.01)

(58) Field of Classification Search
CPC ....... H04L 45/128; H04L 45/22; H04L 45/50; H04L 45/123; H04L 45/28
See application file for complete search history.

(56) References Cited

U.S. PATENT DOCUMENTS

| | | |
|---|---|---|
| 8,296,407 B2 | 10/2012 | Doshi et al. |
| 8,456,984 B2 | 6/2013 | Ranganathan et al. |
| 8,515,280 B1 | 8/2013 | Li et al. |
| 8,576,708 B2 | 11/2013 | Gandhi et al. |
| 8,824,334 B2 | 9/2014 | Vasseur et al. |
| 8,854,955 B2 | 10/2014 | Prakash et al. |
| 8,867,333 B2 | 10/2014 | Doshi et al. |
| 9,167,318 B1 | 10/2015 | Connolly et al. |

(Continued)

OTHER PUBLICATIONS

Mannie, Network Working Group, Standards Track, Generalized Multi-Protocol Label Switching (GMPLS) Architecture, The Internet Society, Oct. 2004, pp. 1-69.

(Continued)

*Primary Examiner* — Hoang-Chuong Q Vu
(74) *Attorney, Agent, or Firm* — Clements Bernard Baratta; Lawrence A. Baratta, Jr.; Christopher L. Bernard

(57) ABSTRACT

Systems and methods for permitted network risks in diverse route determinations introduce the concept of permitted network risks which are risks that may be present in a disjoint path calculation. This removes the binary logic in conventional shared risk path determination, i.e., either exclude or include. With the present disclosure, a network risk may be excluded (must never use) or shared (may use if needed). In an embodiment, if a route for a backup tunnel or path excluding all network risks is not possible, then a route for the backup tunnel or path may be found excluding some network risks of the primary tunnel or path except specified network risks that are determined/specified as permitted network risks. Such permitted network risks can be explicitly specified by a network operator or implicitly determined based on a category (e.g., node and/or equipment may be shared network risks whereas links may not).

18 Claims, 3 Drawing Sheets

(56) References Cited

U.S. PATENT DOCUMENTS

| | | | |
|---|---|---|---|
| 9,197,355 B2 | 11/2015 | Swinkels et al. | |
| 9,497,521 B2 | 11/2016 | Sareen et al. | |
| 2002/0191573 A1* | 12/2002 | Whitehill | H04L 1/1887 370/338 |
| 2003/0131130 A1* | 7/2003 | Malkosh | H04L 12/5692 709/238 |
| 2006/0004916 A1* | 1/2006 | Caviglia | H04L 41/0677 709/223 |
| 2007/0211732 A1* | 9/2007 | Suemura | H04L 45/00 370/400 |
| 2008/0130491 A1* | 6/2008 | Chao | H04L 45/22 370/225 |
| 2008/0170857 A1* | 7/2008 | Bardalai | H04J 14/0286 398/59 |
| 2010/0172236 A1 | 7/2010 | Madrahalli et al. | |
| 2012/0075988 A1* | 3/2012 | Lu | H04L 41/0654 370/218 |
| 2012/0307644 A1* | 12/2012 | Gandhi | H04L 41/0893 370/241 |
| 2013/0003605 A1* | 1/2013 | Peterson | H04L 41/142 370/255 |
| 2013/0010589 A1* | 1/2013 | Kini | H04L 45/50 370/219 |
| 2013/0223225 A1* | 8/2013 | Hui | H04L 41/0836 370/236 |
| 2014/0126355 A1 | 1/2014 | Filsfils et al. | |
| 2014/0147107 A1* | 5/2014 | Swinkels | H04J 14/0256 398/9 |
| 2014/0226967 A1 | 8/2014 | Ahuja et al. | |
| 2014/0258486 A1 | 9/2014 | Filsfils et al. | |
| 2015/0295673 A1* | 10/2015 | Zhang | H04L 45/22 398/5 |
| 2016/0112327 A1 | 4/2016 | Morris et al. | |
| 2016/0164739 A1 | 6/2016 | Skalecki | |
| 2017/0063658 A1* | 3/2017 | Ashwood-Smith | H04L 45/122 |
| 2018/0097725 A1* | 4/2018 | Wood | H04L 45/42 |
| 2018/0191635 A1* | 7/2018 | Karthikeyan | H04L 45/302 |
| 2018/0262421 A1 | 9/2018 | Skalecki et al. | |
| 2021/0119903 A1* | 4/2021 | Skalecki | H04L 45/22 |

OTHER PUBLICATIONS

Kompella et al., Network Working Group, Standards Track, OSPF Extensions in Support of Generalized Multi-Protocol Label Switching (GMPLS), The Internet Society, Oct. 2005, pp. 1-11.

Li et al., Network Working Group, Standards Track, IS-IS Extensions for Traffic Engineering, Redback Networks, Inc., Oct. 2008, pp. 1-17.

Farrel et al., Internet Engineering Task Force (IETF), Best Current Practice, ISSN: 2070-1721, Problem Statement and Architecture for Information Exchange between Interconnected Traffic-Engineered Networks, Jul. 2016, pp. 1-67.

ITU-T, Telecommunication Standardization Sector of ITU, G.8080/Y.1304, Architecture for the automatically switched optical network, Feb. 2012, pp. 1-124.

Wang et al., "Novel disjoint path selection scheme based on link availability in ASON", Journal of China Universities of Posts and Telecommunications, Beijing-Youdian-Daxue, CN, vol. 14, No. 3, Sep. 1, 2007 (Sep. 1, 2007) pp. 70-73, XP022938027, ISSN: 1005-8885(07)60151-4.

Dec. 11, 2020, European Search Report and the Annex to the European Search Report on European Patent Application No. EP 20 20 3025.

* cited by examiner

PERMITTED NETWORK RISKS IN DIVERSE ROUTE DETERMINATIONS

FIELD OF THE DISCLOSURE

The present disclosure generally relates to networking systems and methods. More particularly, the present disclosure relates to systems and methods for permitted network risks in diverse route determinations.

BACKGROUND OF THE DISCLOSURE

Shared Risk Group (SRG) is a concept in network routing that different connections may suffer from a common failure if they share a common risk or a common SRG. SRG can be used with optical networks, Ethernet networks, Multiprotocol Label Switching (MPLS) networks including the Generalized Multiprotocol Label Switching (GMPLS) networks, Internet Protocol (IP) networks, and the like as well as multi-layer networks. An SRG failure makes multiple connections go down because of the failure of a common resource those connections share. Examples of SRGs include Shared Risk Link Group (SRLG), Shared Risk Node Group (SRNG), Shared Risk Equipment Group (SREG), etc. An SRLG is a risk on a cable or the like, an SRNG is a risk associated with a node or network element, and an SREG is a risk that extends within the node or network element itself, e.g., down to a module or other type of equipment. The descriptions herein may reference SRLGs for illustration purposes, but those skilled in the art will recognize any, and all types of SGR risk representation are contemplated herein. SRLGs refer to situations where links in a network share a common fiber (or a common physical attribute such as fiber conduit or the like). If one link fails, other links in the group may fail too, i.e., links in the group have a shared risk which is represented by the SRLG. SRLGs are used in optical, Ethernet, MPLS, GMPLS, and/or IP networks and used for route computation for diversity.

In multi-layer networks, a link at an upper layer has a connection at a lower layer, and thus any network resources (links, nodes, line cards, and the like) used by the lower layer connection can be represented as SRLGs on the upper layer links. That is, MPLS tunnels, OTN connections, IP routes, etc. all operate on a lower layer optical network (Layer 0). For example, an MPLS link at an MPLS layer may have an SRLG to represent a connection at Layer 0 and thus any optical nodes, amplifiers, and muxing/demuxing components, as well as fiber cables and conduits used by the Layer 0 connection, are accounted for in SRLGs on the MPLS link. As an example, one would not want to protect MPLS tunnels where the protected tunnels share a risk in an optical network. The SRLGs are used in the MPLS route computation to ensure the protected tunnels share no common risks in the optical network. That is, route or path computation can compare SRLGs of links between two paths to determine if they are disjoint or not. If two paths have a common risk, i.e., share an SRLG, there is a possibility of a common fault taking both paths down. Of course, this defeats the purpose of protection and is to be avoided.

Current mechanisms of network resource inclusion and exclusion within routing/path computation systems are inadequate to calculate diverse routes in the presence of some network risk types, network configurations, or states. That is, conventional SRGs use binary logic—either a risk is present causing a link, node, or equipment to be avoided or a risk is absent allowing a link, node, or equipment to be used for a disjoint path. This approach treats all networks risks the same. This is not the case in reality. There are types of risks that have a very low (but not zero) probability of failure that are acceptable in terms of a disjoint path determination with SRGs. For example, an optical network element (e.g., an OTN switching node, a Reconfigurable Optical Add/Drop Multiplexer (ROADM), etc.) can fail, but it is far more likely a link (fiber cut) or a piece of equipment in the network element (which can be rerouted around) would fail. That is, a complete nodal failure is possible, but not likely. Ideally, in an MPLS tunnel, primary and backup Label Switched Paths (LSPs) should be routed such that they do not share any common network risks, including the same optical network elements. However, complete node diversity may be difficult or expensive to achieve, and given the fact there is a very low probability of complete nodal failure, this may be a type of risk that is acceptable.

BRIEF SUMMARY OF THE DISCLOSURE

The present disclosure relates to systems and methods for permitted network risks in diverse route determinations. The present disclosure introduces the concept of permitted network risks which are risks that may be present in a disjoint path calculation. This removes the binary logic, i.e., either exclude or include. With the present disclosure, a network risk may be excluded (must never use) or shared (may use if needed). In an embodiment, using MPLS LSPs, if a route for a backup LSP excluding all network risks is not possible, then a route for the backup LSP may be found, excluding some network risks of the primary LSP except specified network risks that are determined/specified as permitted network risks. Such permitted network risks can be explicitly specified by a network operator or implicitly determined based on a category (e.g., SRNG and/or SREG may be shared network risks whereas SRLG may not).

In an embodiment, a method or a non-transitory computer-readable medium includes instructions stored thereon for programming a processor for performing steps of determining a first route for a connection in a network, wherein the connection operates at a first layer of one or more layers; obtaining a plurality of network risks associated with the first route in the one or more layers; and determining a second route to protect the connection from the first route, wherein the second route is determined such that at least some of the plurality of network risks are excluded and permitted network risks of the plurality of network risks are allowed if required. The determining the second route can include determining the second route by excluding all of the plurality of network risks from the first route on the second route; and if unable to determine the second route with all of the plurality of network risks excluded, determining the second route by excluding the some of the plurality of network risks and allowing one or more of the permitted network risks.

The plurality of network risks can include one or more link risks, one or more node risks, and one or more equipment risks. The some of the plurality of network risks can include the one or more link risks and the permitted network risks include the one or more node risks and the one or more equipment risks. The method can further include automatically determining the permitted network risks based on predetermined criteria. The one or more layers can include any of a Time Division Multiplexing (TDM) layer and an optical layer. The permitted network risks can include risks associated with specific network elements at one or more of the TDM layer and the optical layer. The connection can be a Label Switched Path (LSP). The connection can support Fast Reroute (FRR), and the permitted network risks are between a Point of Local Repair (PLR) and a Merge Point (MP).

In another embodiment, an apparatus includes a processor and memory storing instructions that, when executed, cause the processor to determine a first route for a connection in a network, wherein the connection operates at a first layer of one or more layers, obtain a plurality of network risks associated with the first route in the one or more layers, and determine a second route to protect the connection from the first route, wherein the second route is determined such that at least some of the plurality of network risks are excluded and permitted network risks of the plurality of network risks are allowed if required.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a controller which can form a controller for the network element of FIG. 2, a Path Computation Element (PCE), a Software-Defined Networking (SDN) controller, a management system, or the like.

DETAILED DESCRIPTION OF THE DISCLOSURE

Again, the present disclosure relates to systems and methods for permitted network risks in diverse route determinations. The present disclosure introduces the concept of permitted network risks which are risks that may be present in a disjoint path calculation. This removes the binary logic, i.e., either exclude or include. With the present disclosure, a network risk may be excluded (must never use) or shared (may use if needed). In an embodiment, using MPLS LSPs, if a route for a backup LSP excluding all network risks is not possible, then a route for the backup LSP may be found, excluding some network risks of the primary LSP except specified network risks that are determined/specified as permitted network risks. Such permitted network risks can be explicitly specified by a network operator or implicitly determined based on a category (e.g., SRNG and/or SREG may be permitted network risks whereas SRLG may not, as well as other embodiments).

Example Network with SRGs

Figure 1:
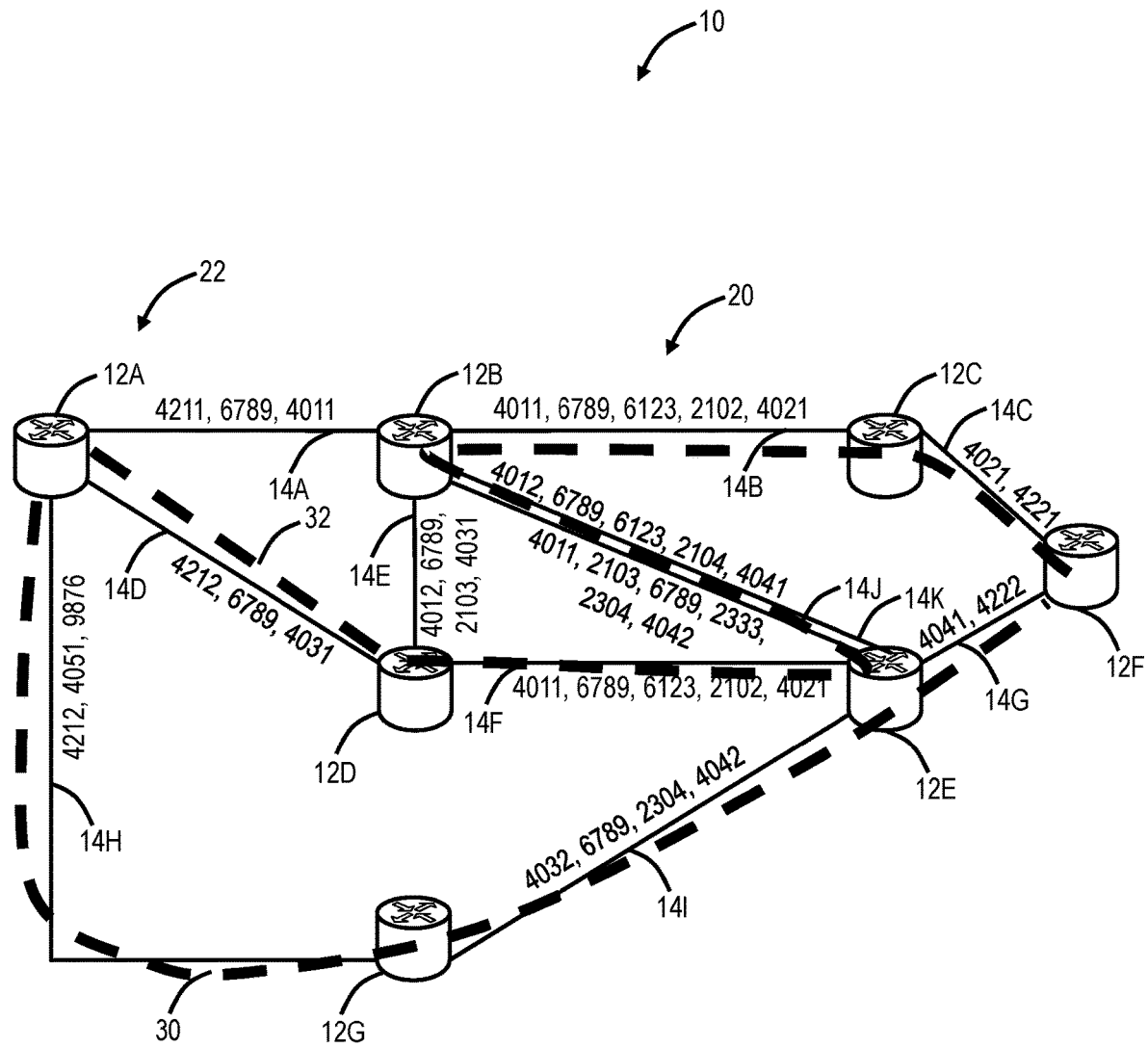
FIG. 1 is a network diagram of a network of network elements interconnected by links.

FIG. 1 is a network diagram of a network 10 of network elements 12 (labeled as network elements 12A-12G) interconnected by links 14 (labeled as links 14A-14I). The network elements 12 communicate with one another over the links 14 through Layer 0 (L0) such as optical wavelengths (Dense Wave Division Multiplexing (DWDM)), Layer 1 (L1) such as OTN, Layer 2 (L2) such as Ethernet, MPLS, etc., Layer 3 (L3) protocols, and/or combinations thereof. The network elements 12 can be network elements which include a plurality of ingress and egress ports forming the links 14. The network elements 12 can be switches, routers, cross-connects, etc. operating at one or more layers. An example network element 12 implementation is illustrated in FIG. 1. The network 10 can include various services or calls between the network elements 12. Each service can be at any of the L0, L1, L2, and/or L3 protocols, such as a wavelength, a Subnetwork Connection (SNC), an LSP, a tunnel, a connection, etc., and each service is an end-to-end path and from the view of the client signal contained therein, it is seen as a single network segment. The network 10 is illustrated, for example, as an interconnected mesh network, and those of ordinary skill in the art will recognize the network 10 can include other architectures, with additional network elements 12 or with fewer network elements 12, etc. as well as with various different interconnection topologies and architectures.

The network 10 can include a control plane operating on and/or between the network elements 12. The control plane includes software, processes, algorithms, etc. that control configurable features of the network 10, such as automating discovery of the network elements 12, capacity on the links 14, port availability on the network elements 12, connectivity between ports; dissemination of topology and bandwidth information between the network elements 12; calculation and creation of paths for calls or services; network-level protection and restoration; and the like. In an exemplary embodiment, the control plane can utilize Automatically Switched Optical Network (ASON) as defined in G.8080/Y.1304, Architecture for the automatically switched optical network (ASON) (02/2005), the contents of which are herein incorporated by reference; Generalized Multi-Protocol Label Switching (GMPLS) Architecture as defined in Request for Comments (RFC): 3945 (10/2004) and the like, the contents of which are herein incorporated by reference; Optical Signaling and Routing Protocol (OSRP) which is an optical signaling and routing protocol similar to PNNI (Private Network-to-Network Interface) and MPLS; or any other type control plane for controlling network elements at multiple layers, and establishing and maintaining connections between nodes. Those of ordinary skill in the art will recognize the network 10 and the control plane can utilize any type of control plane for controlling the network elements 12 and establishing, maintaining, and restoring calls or services between the nodes 12. In another embodiment, the network 10 can include a Software-Defined Networking (SDN) controller for centralized control. In a further embodiment, the network 10 can include hybrid control between the control plane and the SDN controller. In yet a further embodiment, the network 10 can include a Network Management System (NMS), Element Management System (EMS), Path Computation Element (PCE), etc. That is, the present disclosure contemplates any type of controller for path computation utilizing the permitted network risks described herein. That is, the present disclosure is not limited to a control plane, SDN, PCE, etc. based path computation technique.

Again, SRLGs are risks that are compared between two potential paths to ensure diversity therebetween. The risks can include, without limitation, fibers, fiber conduits, physical junctions, bridges, Reconfigurable Optical Add/Drop Multiplexer (ROADM) degree, network element 12, a module in the network element 12, or any physical construct associated with the link 14 physically. For diversity, the SRLGs between two connections are compared, and any shared risk indicates a diversity concern or single point of failure for both connections. The objective of SRLGs is to model various risks to enable comparison during route computation.

In FIG. 1, each link 14 is assigned associated SRLGs 20 for risks, and each is a unique value. Also, each node 12 is assigned associated SRNGs and/or SREGs 22, again each is a unique value representing a specified risk. Note, for illustration purposes, the SRNGs and/or SREGs 22 just show the reference numeral of the network element, e.g., 12A. Also, for illustration purposes, FIG. 1 lists each SRLG 20 as a four-digit number, but those skilled in the art will recognize these SRLGs, SRNGs, and SREGs can be a 32-bit value or the like. For example, the link 14A has SRLGs 4211, 6789, 4011 and the link 14B has SRLGs 4011, 6789, 6123, 2102, 4021. In route computation, the fact these two links 14A, 14B have the same SRLGs 6789, 4011 indicates these links 14A, 14B have a common risk and are not diverse/disjoint. The link 14H has SRLGs 4212, 4051, 9876, and when compared to the link 14A, there are no common SRLGs, and thus these two links 14A, 14H are diverse, i.e., no common risk. Depending on the network 10 implementation, the SRLGs 20 and the SRNGs and/or SREGs 22 can be flooded (in a control plane), managed (in an SDN controller, NMS, EMS, PCE, etc.), or the like.

As an example, assume there are two connections 30, 32 between the network elements 12A, 12F, e.g., the connection 30 can be a primary tunnel (LSP), and the connection 32 can be a backup tunnel (LSP). Thus, there is a requirement for the connection 30 and the connection 32 to be disjoint, i.e., that they do not share a network risk. The connection 30 has a path over links 14H, 14I, 14G. The path for the connection 32 is calculated, and then all of the network risks on the calculated path are compared to the network risks on the path for the connection 30. Assume the only viable path for the connection 32 is through the network element 12E. With conventional approaches, this path would fail as here the connection 32 would share a same network risk, namely the network element 12E, as the connection 30. However, these paths do not share a link 14. The network element 12E is a "permitted network risk." With the present disclosure, this permitted network risk is allowed, such that the connections 30, 32 can share the network element 12E, if required for the connection 32.

Example Network Element/Node

Figure 2:
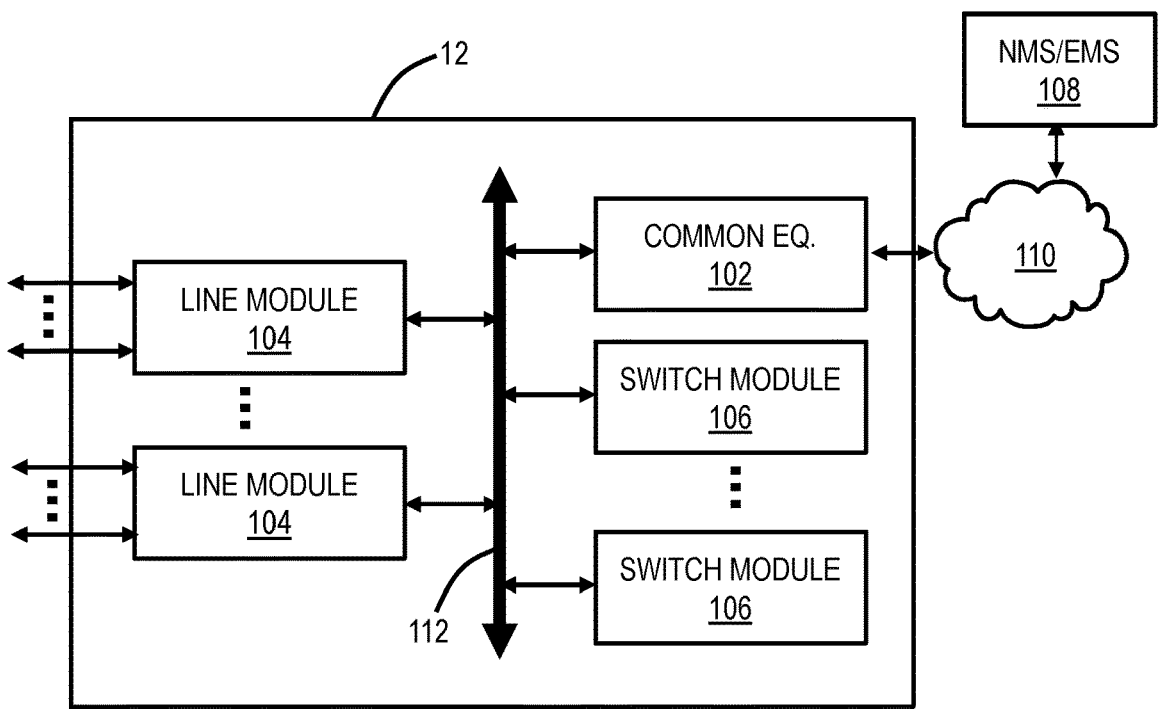
FIG. 2 is a block diagram of an example network element (node) for use with the systems and methods described herein.

FIG. 2 is a block diagram of an example network element 12 (node) for use with the systems and methods described herein. In an embodiment, the network element 12 can be a device that may consolidate the functionality of a Multi-Service Provisioning Platform (MSPP), Digital Cross-Connect (DCS), Ethernet and/or Optical Transport Network (OTN) switch, Wave Division Multiplexed (WDM)/DWDM platform, Packet Optical Transport System (POTS), etc. into a single, high-capacity intelligent switching system providing Layer 0, 1, 2, and/or 3 consolidation. In another embodiment, the network element 12 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a WDM/DWDM terminal, an access/aggregation device, etc. That is, the network element 12 can be any digital and/or optical system with ingress and egress digital and/or optical signals and switching of channels, timeslots, tributary units, wavelengths, etc.

In an embodiment, the network element 12 includes common equipment 102, one or more line modules 104, and one or more switch modules 106. The common equipment 102 can include power; a control module; Operations, Administration, Maintenance, and Provisioning (OAM&P) access; user interface ports; and the like. The common equipment 102 can connect to a management system 108 through a data communication network 110 (as well as a PCE, an SDN controller, etc.). Additionally, the common equipment 102 can include a control plane processor, such as a controller 200 illustrated in FIG. 3 configured to operate the control plane as described herein. The network element 12 can include an interface 112 for communicatively coupling the common equipment 102, the line modules 104, and the switch modules 106 to one another. For example, the interface 112 can be a backplane, midplane, a bus, optical and/or electrical connectors, or the like. The line modules 104 are configured to provide ingress and egress to the switch modules 106 and to external connections on the links to/from the network element 12. In an embodiment, the line modules 104 can form ingress and egress switches with the switch modules 106 as center stage switches for a three-stage switch, e.g., a three-stage Clos switch. Other configurations and/or architectures are also contemplated.

Further, the line modules 104 can include a plurality of optical connections per module, and each module may include a flexible rate support for any type of connection. The line modules 104 can include WDM interfaces, short-reach interfaces, and the like, and can connect to other line modules 104 on remote network elements, end clients, edge routers, and the like, e.g., forming connections on the links in the network 10. From a logical perspective, the line modules 104 provide ingress and egress ports to the network element 12, and each line module 104 can include one or more physical ports. The switch modules 106 are configured to switch channels, timeslots, tributary units, packets, etc. between the line modules 104. For example, the switch modules 106 can provide wavelength granularity (Layer 0 switching); OTN granularity; Ethernet granularity; and the like. Specifically, the switch modules 106 can include Time Division Multiplexed (TDM) (i.e., circuit switching) and/or packet switching engines. The switch modules 106 can include redundancy as well, such as 1:1, 1:N, etc.

Those of ordinary skill in the art will recognize the network element 12 can include other components which are omitted for illustration purposes, and that the systems and methods described herein are contemplated for use with a plurality of different network elements with the network element 12 presented as an example type of network element. For example, in another embodiment, the network element 12 may not include the switch modules 106, but rather have the corresponding functionality in the line modules 104 (or some equivalent) in a distributed fashion. Also, the network element 12 may omit the switch modules 106 and that functionality, such as in a DWDM terminal. For the network element 12, other architectures providing ingress, egress, and switching are also contemplated for the systems and methods described herein. In general, the systems and methods described herein contemplate use with any network element, and the network element 12 is merely presented as an example for the systems and methods described herein.

Example Controller

Figure 3:
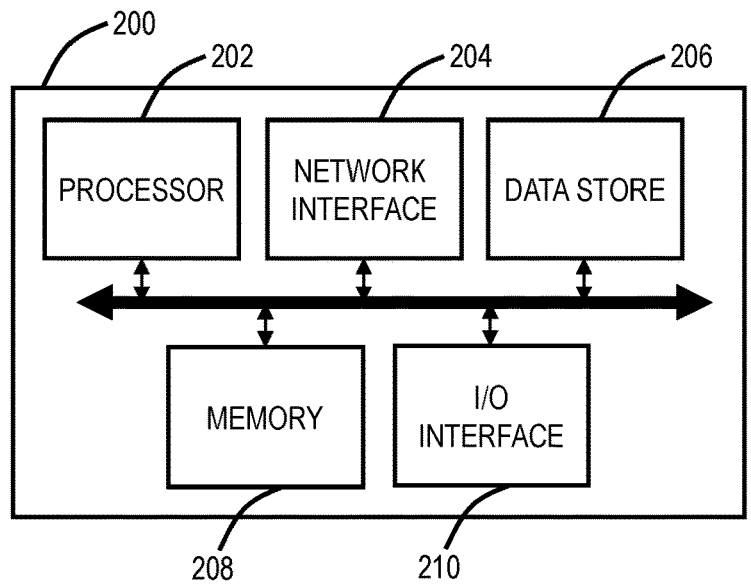

FIG. 3 is a block diagram of a controller 200 which can form a controller for the network element 12, a PCE, an SDN controller, the management system 108, or the like. The controller 200 can be part of the common equipment, such as common equipment 102 in the network element 100, or a stand-alone device communicatively coupled to the network element 100 via the data communication network 110. In a stand-alone configuration, the controller 200 can be the management system 108, a PCE, etc. The controller 200 can include a processor 202 which is a hardware device for executing software instructions such as operating the control plane. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 54 can be used to enable the controller 200 to communicate on the DCN 40, such as to communicate control plane information to other controllers, to the management system 108, to the nodes 100, and the like. The network interface 204 can include, for example, an Ethernet module. The network interface 204 can include address, control, and/or data connections to enable appropriate communications on the network. The data store 206 can be used to store data, such as control plane information, provisioning data, OAM&P data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices. Further, the I/O interface 210 includes components for the controller 200 to communicate with the other nodes, such as using overhead associated with OTN signals.

The controller 200 is configured to implement software, processes, algorithms, etc. that can control configurable features of the network 10, such as automating discovery of the network elements 12, capacity on the links 14, port availability on the network elements 12, connectivity between ports; dissemination of topology and bandwidth information between the network elements 12; path computation and creation for connections; network-level protection and restoration; and the like. As part of these functions, the controller 200 can include a topology database that maintains the current topology of the network 10, such as based on control plane signaling and a connection database that maintains available bandwidth on the links again based on the control plane signaling as well as management of the network risks for diverse path computation.

Permitted Network Risks

Again, the present disclosure proposes a new type of network resource usage constraint, namely the permitted network risk. As described herein, the permitted network risk is one that is preferably avoided but allowed if required. When requesting a pair (or more) of diverse routes for a service or connection across the network 10, the request can specify or the system can determine one or more network risk values (e.g., SRLGs, SRNGs, SREGs, etc.) that may (but need not) be shared by the two (or more) routes, i.e., having the routes use the specified or determined permitted network risk do not constitute a diversity violation. The permitted network risk may equate to a node, link, equipment, or any type of risk represented by an SRG value (e.g., ROADM node, amplifier, conduit, Central Office, etc).

Again, conventional routing and path computation systems only support network resource inclusion and exclusion, e.g., include node X, exclude link Y, etc. That is, when requesting a pair (or more) of routes for a service or connection across the network 10, the request can optionally specify one or more network risk values that must be excluded and/or must be included in the two (or more) routes. The new permitted network risks introduce the semantic of "may," i.e., these risks may be included in the two (or more) routes but do not have to be included if not necessary.

There are some types of network risks and network configurations whereby it may not be possible to find diverse routes unless these network risks are part of the routes in a particular network state. For example, consider a multi-layer network where an MPLS node is connected to other MPLS nodes via OTN or ROADM switching nodes. That is, MPLS nodes are interconnected via MPLS links that are implemented as OTN or ROADM connections. In some configurations, an MPLS node may be connected to neighboring MPLS nodes via a single OTN or ROADM node, and, in some cases, an MPLS node may be dual-homed (or multi-homed) via two OTN or ROADM nodes. Under ideal circumstances, a 1:1 or 1+1 Protected MPLS tunnel from an MPLS node would include a primary LSP that passes through one OTN or ROADM node and a backup LSP that passes through the other OTN or ROADM node. However, when the OTN or ROADM node fails, and in order to return the Protected MPLS tunnel back to 1:1 or 1+1 state, it may be desirable to allow the 1:1 or 1+1 Protected MPLS tunnel to have both primary and backup LSPs to pass through the same OTN or ROADM node. Inclusion and exclusion semantics provide no direct solution, but the permitted semantic does. Basically, the 1:1 or 1+1 Protected MPLS tunnel can be provisioned with permitted network risks representing both the OTN or ROADM nodes, or the system could dynamically determine that both OTN or ROADM nodes are permitted network risks. When both OTN or ROADM nodes are non-failed, the 1:1 or 1+1 Protected MPLS tunnel can include the primary LSP that passes through one OTN or ROADM node and the backup LSP that passes through the other OTN or ROADM node. But when one OTN or ROADM node fails, then the 1:1 or 1+1 Protected MPLS tunnel will be allowed to have both primary and backup LSPs to pass through the same OTN or ROADM node, i.e., through the same permitted network risk.

In core networks, it is usually possible to route protected connections at a source node and a destination node via separate optical degrees, i.e., ROADM equipment such as Wavelength Selective Switches (WSSs). In metro networks, often, a ROADM node may be configured such that connections entering or exiting the node share the same degree components, i.e., WSSs. Again, it is a lower probability that a degree would fail (versus a link failure-fiber cut), and this is an example of a permitted network risk. In such a scenario, it may not be possible to have diverse connections as the ROADM node in such a configuration would always have shared risks at the first and last hop in the network.

Figure 4:
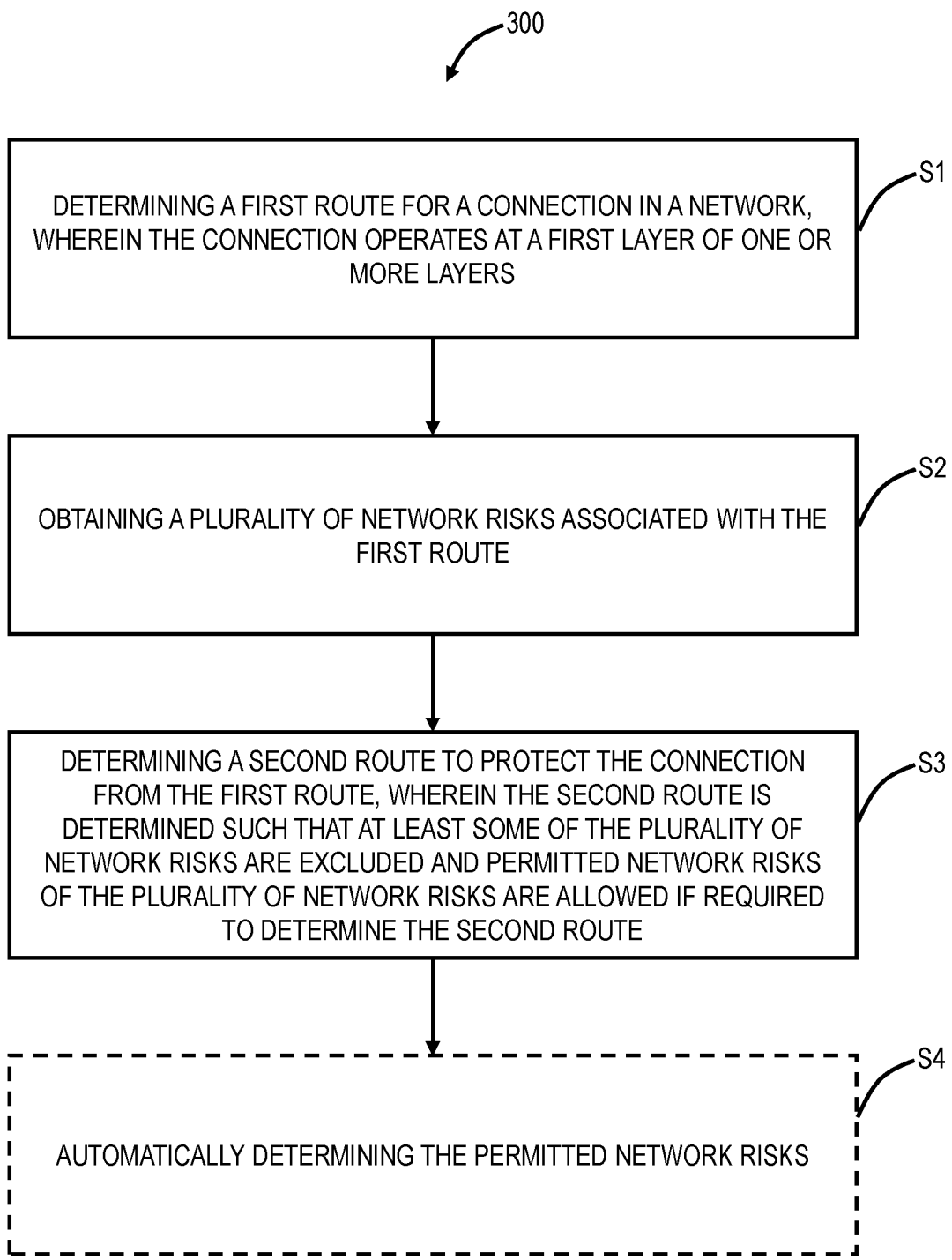
FIG. 4 is a flowchart of a permitted network risk process.

FIG. 4 is a flowchart of a permitted network risk process 300. The permitted network risk process 300 can be a computer-implemented method, implemented through an apparatus such as the network element 12 or the controller 200, and embodiment as instructions in a non-transitory computer-readable medium that cause a processor to execute the steps. The permitted network risk process 300 includes determining a first route for a connection in a network, wherein the connection operates at a first layer of one or more layers (step S1); obtaining a plurality of network risks associated with the first route (step S2); and determining a second route to protect the connection from the first route, wherein the second route is determined such that at least some of the plurality of network risks are excluded and permitted network risks of the plurality of network risks are allowed if required to determine the second route (step S3). The permitted network risk process 300 can further include automatically determining the permitted network risks based on predetermined criteria (step S4). Note, while the steps are shown in a particular order in FIG. 4, those of ordinary skill in the art will appreciate the steps may be performed in different orders. For example, the step S4 may occur prior to the step S3. The predetermined criteria can specify which types of risks are permitted or not. For example, the predetermined criteria can say degrees (equipment) or nodes are permitted risks whereas links are not.

Optionally, the network risk process 300 can include determining the second route by excluding all of the plurality of network risks on the second route; and, if unable to determine the second route with all of the plurality of network risks excluded, determining the second route by excluding the some of the plurality of network risks and allowing one or more of the permitted network risks.

The plurality of network risks can include one or more link risks, one or more node risks, and one or more equipment risks. The some of the plurality of network risks can include the one or more link risks and the permitted network risks include the one or more node risks and the one or more equipment risks. The one or more layers can include any of a Time Division Multiplexing (TDM) layer and an optical layer. The permitted network risks can include risks associated with specific network elements at one or more of the TDM layer and the optical layer. The connection can be a Label Switched Path (LSP). Optionally, the connection supports Fast Reroute (FRR), and the permitted network risks are between a Point of Local Repair (PLR) and a Merge Point (MP).

For example, a route calculation for a 1:1 or 1+1 Protected MPLS tunnel could follow the following typical steps. First, find a route for the primary LSP. Second, determine network risks (node, link, equipment, etc.) of the primary LSP. Third, find a route for the backup LSP, excluding all of the network risks of the primary LSP. Fourth, if the route for the backup LSP is found, then proceed to establish the primary and backup LSPs on the found routes. Otherwise, if the route for the backup LSP is not found, find a route for the backup LSP, excluding the network risks of the primary LSP except the permitted network risks. If the route for the backup LSP is found (with the permitted network risks), then proceed to establish the primary and backup LSPs on the found routes. Otherwise, there are no diverse routes, even in the context of permitted network risks.

As described herein, the permitted network risks enable these risks to not count as diversity conflicts between the primary and backup LSPs. Also note that if a totally diverse pair of paths can be computed without sharing the permitted risks, then such routes can be used.

The permitted network risks may be applied in global as well as local scope. An example of a global scope is two (or more) diverse routes between source and destination nodes. An example of local scope is Fast Reroute (FRR) type of mechanisms where detour or bypass routes may be set up that are diverse to the route/link/node they are protecting.

Note that the determination of the permitted risks can be through various techniques. There are various ways this can be achieved based on planning and/or understanding of common unavoidable risks. Some examples where the unavoidable risks are easily identified include:

1. Central Office (CO) office risk or MPLS node risk as both primary and backup path start/end will unavoidably have the same CO or MPLS node risks.

2. Consider any risk that is common to all Internet Protocol (IP) interfaces of a given node as an unavoidable risk.

Note that the PCE or control plane awareness of such permitted risks can be passed explicitly in a request constraint or can be signaled using Interior Gateway Protocol (IGP) extensions by every node after the higher-level system (planning, NMS, etc.) has identified the unavoidable risks for such node (e.g., CO risk, mode risk, etc).

Further, note that permitted risks may represent specific instances of SRLG, such as particular OTN or ROADM nodes, or may be a whole class of SRLGs such as all OTN or ROADM switching nodes.

Still further, the present disclosure can be used in the context of global routing or local routing such as Fast Reroute (FRR). In the context of FRR, bypass or detour LSPs can be routed such that they share specific instances of network risks related to Point of Local Repair (PLR) or Merge Point (MP), or they share a whole class of Network Risks such as all OTN switching nodes between PLR and MP.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a processor for performing steps of:
   determining a first route for a connection in a network, wherein the connection operates at a first layer of one or more layers, wherein the first layer is Layer 2 or above;
   obtaining a plurality of network risks associated with the first route with the plurality of network risks being at the one or more layers including any of a Time Division Multiplexing (TDM) layer and an optical layer; and
   determining a second route to protect the connection from the first route, wherein the second route requires at least some of the plurality of network risks are excluded and permitted network risks of the plurality of network risks are included to determine the second route, wherein the at least some of the permitted network risks are associated with a node that is one or more of an Optical Transport Network (OTN) node and a Reconfigurable Optical Add/Drop Multiplexer (ROADM) node.

2. The non-transitory computer-readable medium of claim 1, wherein the determining the second route includes
   determining the second route by excluding all of the plurality of network risks from the first route on the second route; and
   if unable to determine the second route with all of the plurality of network risks excluded, determining the second route by excluding the some of the plurality of network risks and allowing one or more of the permitted network risks.

3. The non-transitory computer-readable medium of claim 1, wherein the plurality of network risks include one or more link risks, one or more node risks, and one or more equipment risks, at the one or more layers.

4. The non-transitory computer-readable medium of claim 3, wherein the some of the plurality of network risks include the one or more link risks and the permitted network risks include the one or more node risks and the one or more equipment risks.

5. The non-transitory computer-readable medium of claim 1, wherein the instructions further program the processor to perform steps of automatically determining the permitted network risks based on predetermined criteria.

6. The non-transitory computer-readable medium of claim 1, wherein the permitted network risks include risks associated with specific network elements at one or more of the TDM layer and the optical layer.

7. The non-transitory computer-readable medium of claim 1, wherein the connection is a Label Switched Path (LSP).

8. The non-transitory computer-readable medium of claim 7, wherein the connection supports Fast Reroute (FRR), and the permitted network risks are between a Point of Local Repair (PLR) and a Merge Point (MP).

9. An apparatus comprising:
   a processor and memory storing instructions that, when executed, cause the processor to
      determine a first route for a connection in a network, wherein the connection operates at a first layer of one or more layers, wherein the first layer is Layer 2 or above,
      obtain a plurality of network risks associated with the first route with the plurality of network risks being at the one or more layers including any of a Time Division Multiplexing (TDM) layer and an optical layer, and
      determine a second route to protect the connection from the first route, wherein the second route requires at least some of the plurality of network risks are excluded and permitted network risks of the plurality of network risks are included to determine the second route, wherein the at least some of the permitted network risks are associated with a node that is one or more of an Optical Transport Network (OTN) node and a Reconfigurable Optical Add/Drop Multiplexer (ROADM) node.

10. The apparatus of claim 9, wherein the second route is determined by
    first excluding all of the plurality of network risks from the first route on the second route; and
    if unable to determine the second route with all of the plurality of network risks excluded, excluding the some of the plurality of network risks and allowing one or more of the permitted network risks.

11. The apparatus of claim 9, wherein the plurality of network risks include one or more link risks, one or more node risks, and one or more equipment risks, at the one or more layers.

12. The apparatus of claim 11, wherein the some of the plurality of network risks include the one or more link risks and the permitted network risks include the one or more node risks and the one or more equipment risks.

13. The apparatus of claim 9, wherein the instructions that, when executed, further cause the processor to
    automatically determine the permitted network risks based on predetermined criteria.

14. The apparatus of claim 9, wherein the permitted network risks include risks associated with specific network elements at one or more of the TDM layer and the optical layer.

15. The apparatus of claim 9, wherein the connection is a Label Switched Path (LSP).

16. The apparatus of claim 15, wherein the connection supports Fast Reroute (FRR), and the permitted network risks are between a Point of Local Repair (PLR) and a Merge Point (MP).

17. A method comprising:
    determining a first route for a connection in a network, wherein the connection operates at a first layer that of one or more layers, wherein the first layer is Layer 2 or above;
    obtaining a plurality of network risks associated with the first route with the plurality of network risks being at the one or more layers including any of a Time Division Multiplexing (TDM) layer and an optical layer; and
    determining a second route to protect the connection from the first route, wherein the second route requires at least some of the plurality of network risks are excluded and permitted network risks of the plurality of network risks are included to determine the second route, wherein the at least some of the permitted network risks are associated with a node that is one or more of an Optical Transport Network (OTN) node and a Reconfigurable Optical Add/Drop Multiplexer (ROADM) node.

18. The method of claim 17, wherein the determining the second route includes
   determining the second route by excluding all of the plurality of network risks from the first route on the second route; and
   if unable to determine the second route with all of the plurality of network risks excluded, determining the second route by excluding the some of the plurality of network risks and allowing one or more of the permitted network risks.

* * * * *